United States Patent [19]

Robinson

[11] 4,195,472
[45] Apr. 1, 1980

[54] GAS TURBINE WITH FORWARD AND REVERSE MARINE DRIVE

[75] Inventor: Donovan L. Robinson, Indianapolis, Ind.

[73] Assignee: General Motors Corporation, Detroit, Mich.

[21] Appl. No.: 876,032

[22] Filed: Feb. 8, 1978

[51] Int. Cl.² ............................ F02C 3/10; F02C 4/02
[52] U.S. Cl. .................... 60/39.16 S; 192/4 C
[58] Field of Search ................ 192/4 C, 4 R, 4 B; 60/39.16 S

[56] References Cited

U.S. PATENT DOCUMENTS

| | | | |
|---|---|---|---|
| 3,458,018 | 7/1969 | Shore | 192/4 C |
| 3,830,350 | 8/1974 | Worthen | 192/4 C |
| 3,910,389 | 10/1975 | Pleier | 192/4 C |
| 3,913,700 | 10/1975 | James | 192/4 C |
| 4,018,316 | 4/1977 | McQuinn et al. | 60/39.16 S |
| 4,051,679 | 10/1977 | Collin | 192/4 C |

*Primary Examiner*—George H. Krizmanich
*Attorney, Agent, or Firm*—A. M. Heiter

[57] ABSTRACT

A gas turbine engine drive for a marine propeller having a forward and reverse drive transmission having controls operative during engine operation in a braking neutral position to decrease engine inertia and to brake the input and engine and also the output and propeller prior to shifting to either a forward or reverse drive to reduce shift shock, and a positive neutral position to positively disconnect the input and output so the engine can drive accessories without driving the output and propeller, and operative when the engine is not operating to brake the input and engine and also the output and propeller. In another control, the reverse drive signal decreases engine inertia in braking neutral.

16 Claims, 3 Drawing Figures

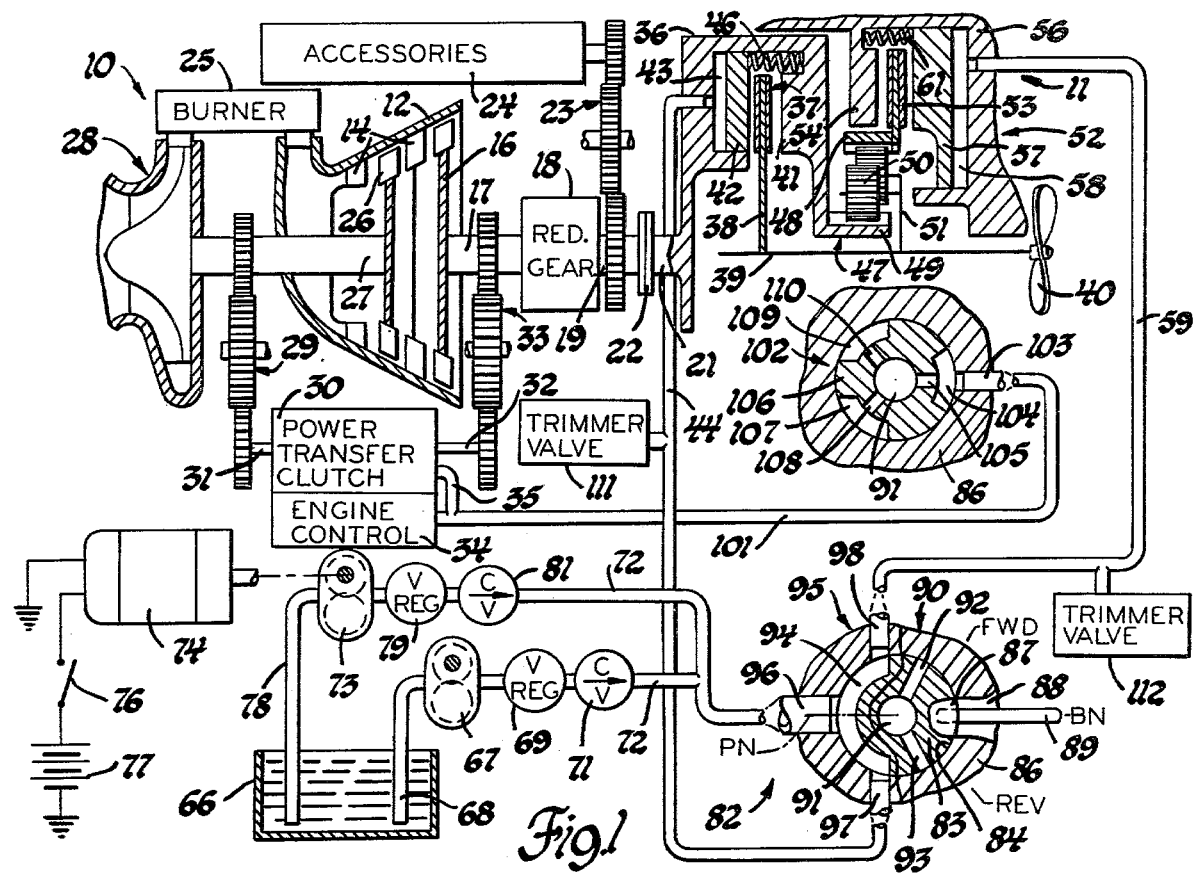
Fig.1
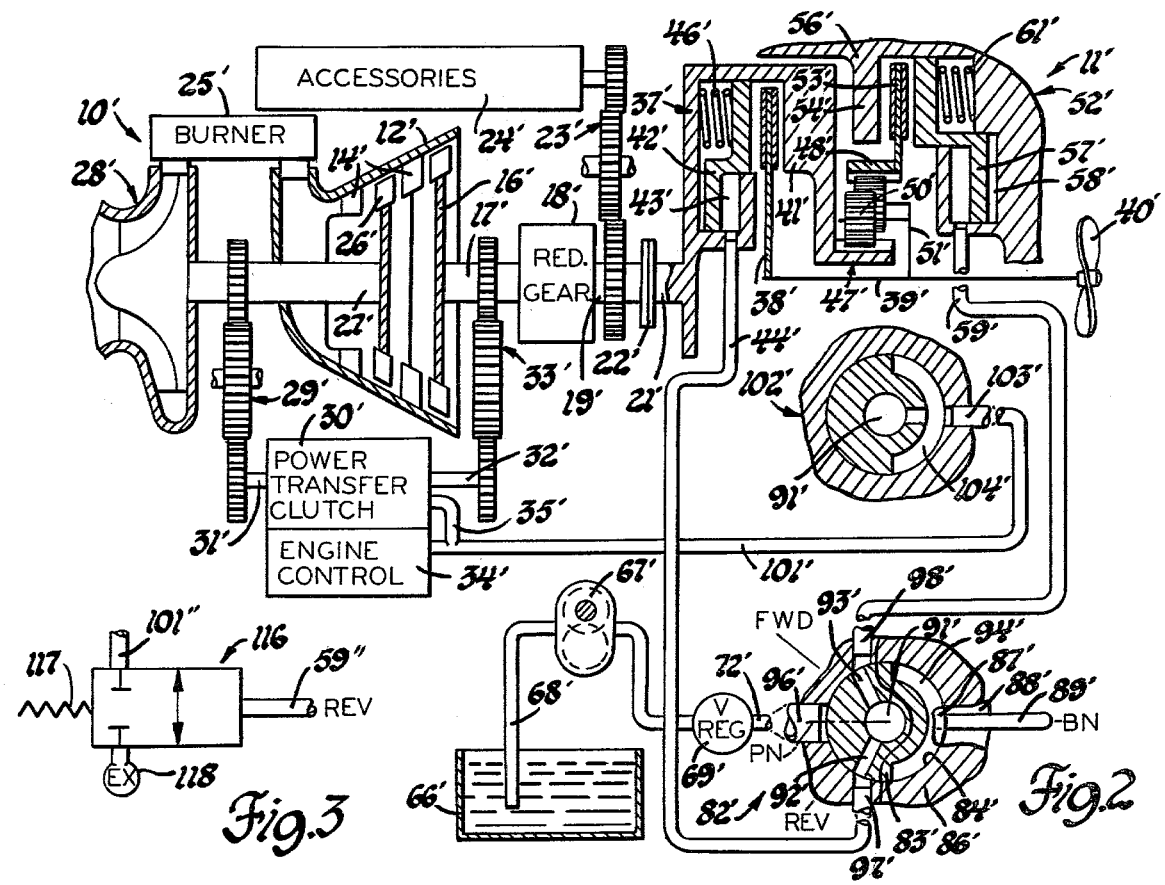
Fig.3
Fig.2

GAS TURBINE WITH FORWARD AND REVERSE MARINE DRIVE

This invention relates to transmissions and marine drives employing transmissions, and particularly to transmission and engine controls.

The invention provides a transmission having a plurality of selectively establishable drives in which the simultaneous establishment of two drives operates to brake the input and output in combination with controls movable in a shift path between two drive positions to a braking neutral position operative to simultaneously establish the two drives to brake the transmission input and output to reduce input and output speed to reduce engine inertia and propeller inertia and, on continued movement in the shift path to each selected one of the two drive positions, to disestablish the other drive and to maintain and complete the establishment of the selected one drive with reduced shift shock. The controls also disengage the power transfer clutch of the gas turbine engine in braking neutral position and during shift change to reduce engine inertia.

The controls are also movable from either drive position in a separate path to a positive neutral or accessory drive position to disestablish both drives and permit input drive to accessories without output drive and then to the other drive position. The controls and transmission are also operative when the transmission input is not driven by an engine to provide the braking neutral operation. The transmission controls in braking neutral position and during shift change are also operative on engine controls to reduce engine inertia, particularly by disengaging a power transfer clutch in a two-shaft gas turbine engine. In a modified control, the reverse drive signal disengages the power transfer clutch in braking neutral position to reduce engine inertia.

In a preferred form of the invention, the transmission has a fluid operated forward drive establishing device operable in response to forward drive pressure to establish forward drive, and a fluid operated reverse drive establishing device operable in response to reverse drive pressure to establish reverse drive. The control, during engine driving operation in an initial portion of the shift path or braking neutral position, supplies fluid pressure to both the forward and reverse drive establishing devices to brake the transmission input and output and then, with continued movement in the shift path to the selected one of the drive positions, continues to supply fluid to the selected drive device to establish the selected drive, and exhausts fluid from the other drive device to disestablish the other drive. The control is also movable in a second separate path to a positive neutral position to exhaust both devices to provide a positive neutral in the transmission. In braking neutral position and during shifting, the control exhausts and disengages the power transfer clutch of the two-shaft gas turbine engine to reduce engine inertia. When the engine is not running, a source of fluid pressure independent of engine operation may be provided for operation of the control, especially for braking neutral, so the propeller does not rotate the engine during sailing operation of the boat.

In another form of the invention, the transmission has fluid operated forward and reverse drive establishing devices which are both actuated by springs when the forward and reverse release chambers are exhausted to respectively establish forward and reverse drive, and by forward and reverse release pressure fluid, to respectively disestablish forward and reverse drives. The control during engine operation in the braking neutral position exhausts both release chambers, so both the forward and reverse drive devices are spring applied to brake both the input and output. On a shift to either forward or reverse positions respectively, either the reverse or forward release chamber is supplied with fluid under pressure to disestablish the reverse or forward drive device and establish forward or reverse drive. The control, on movement in another path to positive neutral position, supplies fluid under pressure to both release chambers to disestablish both drives for a positive neutral. The control similarly disengages the power transfer clutch in braking neutral position. When the engine is not operating, the source does not supply fluid pressure so the control, especially in braking neutral position, by operation of the springs provides braking operation.

These and other features of the invention are more particularly described with reference to the preferred embodiments in the following specification and accompanying drawings, wherein:

FIG. 1 is a schematic view of the marine power train and the control system;

FIG. 2 is a schematic view of a modified marine power train and the control system; and FIG. 3 is a partial schematic view of a control modification.

The power train has a gas turbine engine 10 and a forward and reverse drive transmission 11 of the type wherein both the forward and reverse drives may be established to brake both the input and output of the transmission.

The engine 10 is a known two-shaft gas turbine engine having a housing 12 with a stator 14. The power turbine 16 drives power turbine shaft 17 which directly or through reduction gearing 18 drives the engine output shaft 19. Engine output shaft 19 may be integral with transmission input shaft 21 or be connected by coupling 22. Accessory drive gearing 23 connects engine output shaft 19 to drive accessories 24, such as a generator. The compressor turbine 26 drives compressor shaft 27 which drives compressor 28 and spur gearing 29. The gas generating means, which includes compressor 28, burner 25, and the fuel feed system portion of conventional engine control 34, delivers gas to turbines 16 and 26. Power transfer clutch 30 is drive connected by shaft 31 and gearing 29 to compressor shaft 27, and by shaft 32 and gearing 33 to power turbine shaft 17 to transfer power between compressor shaft 27 and power turbine shaft 17. Engine control 34 also has a clutch control supplying a signal pressure by power transfer clutch apply line 35 to variably engage clutch 30 in response to engine operating conditions, e.g., torque, compressor speed and temperature, for predetermined power transfer for optimum engine operation.

Spur gearing 29 also drives the engine controls 34, accessories which include a fuel pump and engine control fluid pressure pump (not shown), and the transmission main fluid pressure pump 67. A known engine and control of this type are shown in detail in U.S. Pat. No. 3,237,404 Flanigan et al, granted Mar. 1, 1966.

The forward and reverse drive transmission 11 has a rotary housing 36 driven by transmission input shaft 21. Forward clutch 37 has a driven plate 38 drive connected to transmission output shaft 39 which drives a propeller 40 or other driven load. Driven plate 38 is located between backing plate 41, formed as a portion of housing 36, and piston 42 located in cylinder 43 formed in rotary housing 36. Forward clutch apply fluid under pressure is supplied by forward apply line 44 to cylinder 43, or the forward apply chamber therein, to compress retraction or release spring 46 to engage forward clutch 37 mounted in housing 36 to establish forward drive from transmission input shaft 21 to output shaft 39. When forward apply line 44 is exhausted, retraction spring 46 disengages forward clutch 37 to disestablish forward drive.

Reverse gearing 47 has ring gear 48, sung gear 49 drive connected to transmission input driven rotary housing 36, dual planetary pinions 50 meshing with ring gear 48 and sun gear 49 and rotatably mounted on carrier 51 which is drive connected to transmission output shaft 39. Reverse ground clutch or reaction brake 52 has a brake plate 53 drive connected to ring gear 48 and located between backing plate 54 fixed to transmission stationary housing 56, and a piston 57 in cylinder 58. Fluid under pressure is supplied by reverse apply line 59 to cylinder 58, or the apply chamber therein, to move piston 57 to compress release spring 61 and engage reaction brake 52 to establish reverse drive from transmission input shaft 21 through reverse gearing 47 to output shaft 39. When reverse apply line 59 is exhausted, release spring 61 similarly disengages reaction brake 52 to disestablish reverse drive.

The transmission 11 may be specifically constructed as shown in U.S. Pat. No. 2,521,239 McDowall et al, granted Sept. 5, 1950. Other forward and reverse drive planetary transmissions in which either a forward or a reverse drive device may be selectively operated to respectively engage forward or reverse drive, both a forward and reverse drive device may be simultaneously operated to simultaneously engage both drives to brake the input and output shafts to the stationary housing or ground and to simultaneously disengage both devices for a positive neutral, can be used. Forward clutch 37 and reverse brake 52 are respectively forward and reverse fluid pressure operated drive establishing devices which are actuated by apply pressure to engage to establish the forward and reverse drives and by exhaust of apply line pressure and disengaged by the retraction springs to disestablish the forward and reverse drives.

CONTROLS

Sump 66 is a common engine transmission sump which collects exhaust and leakage fluid from the control and lubrication systems for the engine and transmission or a transmission sump. Transmission main pump 67 is driven by engine compressor shaft 27 and gearing 29 and, when engine 10 is operating, pumps fluid from sump 66 through suction line 68 to regulator valve 69, which regulates mainline pressure, and through one-way check valve 71 to mainline 72. Auxiliary pump 73 is driven by electric motor 74 when switch 76 is closed to connect grounded power source 77 to energize the grounded motor when engine 10 is shut down or not operating. Auxiliary pump 73 pumps fluid from sump 66 through suction line 78 to regulator valve 79 to deliver a regulated fluid pressure through check valve 81 to mainline 72. Regulator valve 79 may be set at a lower pressure where transmission pressure requirements are lower, during auxiliary pump operation during engine shut-down. When the same pressure is used during engine operation and engine shut-down, the pumps 67 and 73 are gear pumps which prevent fluid flow when they are not driven and thus perform the functions of check valves 71 and 81, so the check valves will not be required and only one regulator valve will be required.

CONTROL VALVE

The control valve 82 has a rotary valve element 83 mounted for rotation in bore 84 of valve body 86 secured to or formed in transmission housing 56. The end-portion 87 of valve element 83 projects beyond the end face 88 of valve body 86, as shown in the partial section adjacent handle 89. Handle 89 is secured to end-portion 87 for manual rotation of the handle and valve element 83 to the neutral or braking neutral position (BN) shown, forward position (FWD), the accessory or positive neutral position (PN), and reverse position (REV). The braking neutral position (BN) is so called because in this position, the drive train is braked to stop rotation or hold the drive train stationary, and is also called neutral position because it is used as the neutral position when shifting between forward (FWD) and reverse (REV). The positive neutral position (PN) is so called because in this position, the transmission 11 positively disconnects the drive train, and is also called accessory position because it is used to drive the engine driven accessories when the propeller is not driven, such as when the boat is at dockside.

Conventional detent and axial locating means (not shown) permits rotary movement of valve element 83 to each of the above positions, resiliently retains valve element 83 in each position, and limits axial movement of valve element 83. A seal (not shown) is provided between the valve element and bore 84 in body 86 at the handle 89 end. The other, or exhaust end of bore 84 is suitably located within transmission housing 56 or otherwise connected for exhaust of axial exhaust passage 91 to sump 66. The axial exhaust passage 91 extends through valve element 83 from the exhaust end to the transmission exhaust port section 90 and connects with radial exhaust passages 92 and 93. The supply passage 94 is a partial-annular passage located in the supply section 95 which is axially spaced from the exhaust port section, as indicated by the separate partial sections for the exhaust and supply ports. The supply port 96 is in the supply section to connect to supply passage 94 and does not extend into the exhaust section. The forward and reverse ports 97 and 98 are in both the supply section and exhaust section for connection to either supply passage 94 or exhaust passages 92 and 93. The power transfer clutch apply line 35 is connected by branchline 101 to power transfer clutch control section 102 of control valve 82 for exhaust and disengagement of power transfer clutch 30 if the engine controls 34 have engaged the power transfer clutch 30 to reduce engine inertia when the control valve 82 is in and near the braking neutral (BN) position to brake the transmission input and output when moved from the positive neutral (PN) position to either forward (FWD) or reverse (REV) position. Disengagement of a power transfer clutch for shifting is known, in U.S. Pat. No. 3,899,877 Flanigan et al, granted Aug. 19, 1975. With control valve element 83 in and near the braking neutral (BN) position shown, branchline 101 is connected by line port 103 to exhaust port 104 and radial passage 105 to axial exhaust passage 91 to ensure disengagement of the power transfer clutch 30 during the entire braking period, from the initial slipping engagement, during full engagement and until release, to reduce engine inertia and the capacity requirements on both transmission drive devices, forward clutch 37, and reverse brake 52. In addition, ensuring disengagement of the power transfer clutch 30 permits low speed or stalling of power turbine 16 and continued normal operation of compressor turbine 26, burner 25, and engine controls 34, preferably at idle speed so the engine is not stalled and is ready to deliver power on the shift to a drive and reestablishment of engine control of the power transfer clutch for normal engine operation. When control valve element 83 is in the positive neutral (PN) position, line port 103 is blocked by land 106, so engine controls 34 control the power transfer clutch 30 for optimum engine operation to drive accessories 24. On a shift from positive neutral position to either forward position or reverse position, line port 103 is respectively connected by exhaust port 107 and passage 108 or exhaust port 109 and passage 110 to exhaust passage 91 to ensure disengagement of power transfer clutch 30 during the shift and to permit engagement of power transfer clutch 30 on establishing the drive.

A forward trimmer valve 111 and a reverse trimmer valve 112 are respectively connected to forward apply line 44 and reverse apply line 59 to smooth high power shifts from positive neutral to forward or reverse drive. The known trimmer valves may be constructed as shown, e.g., in U.S. Pat. No. 3,691,872 Schaefer et al, granted Sept. 19, 1972, and function to regulate apply pressure for the forward clutch 37 or the reverse brake 52 at an initial low value on initial supply of apply pressure, and to gradually increase apply pressure in a low pressure range during a short engagement time period, and then after engagement to increase apply pressure to mainline pressure. The initial and low range of apply pressure may be varied in proportion to torque demand by compressor discharge pressure.

With valve element 83 in the braking neutral (BN) position shown, mainline 72 is connected by supply port 96 in valve body 86 and through supply passage 94 in valve element 83 to both forward port 97, connected by forward apply line 44 to forward clutch 37, and reverse port 98, connected by reverse apply line 59 to reverse brake 52, to establish both the forward and reverse drives to provide braking of both the transmission input and output shafts 21 and 39. The supply overlap between supply passage 94 and both forward and reverse ports 97 and 98 will determine the degree of valve element 83 rotation during which braking occurs. The exhaust overlap of exhaust port 104 relative to line port 103 will determine the degree of valve element 83 rotation during which power transfer clutch apply line 35, 101, is exhausted. This exhaust overlap is preferably equal to the supply overlap to ensure disengagement of the power transfer clutch 30 during the braking period. In the braking neutral (BN) position, during steady state operation the engaged forward clutch 37 and reverse brake 52 brake transmission input and output shafts 21 and 39 to a low speed, preferably stationary. When the engine output shaft 19 is rotating at a low or zero speed or stationary, engine controls 34 operate to disengage power transfer clutch 30. Also, power transfer clutch apply line 35 is connected by branchline 101, ports 103, 104, and radial passage 105 to exhaust passage 91 to prevent engagement of power transfer clutch 30 by engine controls 34. On rotation of handle 89 from braking neutral (BN) position to forward (FWD) position, supply passage 94 is disconnected and radial exhaust passage 92 is connected to reverse port 98 to disengage reverse brake 52, so the already engaged forward clutch 37 establishes forward drive. At that time ports 103 and 104 close, blocking power transfer clutch apply line branchline 101 to return power transfer clutch 30 to control by the engine controls 34. As engine output speed increases in forward drive, engine controls 34 partially and then fully engage power transfer clutch 30.

On movement of handle 89 from forward (FWD) position to braking neutral (BN) position, power transfer clutch apply line 35 is exhausted to disengage power transfer clutch 30 if engine control 34 calls for its engagement, to reduce engine inertia; forward clutch 37 remains engaged and, at the same time, reverse brake 52 is then engaged, so both forward clutch 37 and reverse brake 52 are engaged for braking. The required braking capacity of reverse brake 52 is reduced, as only the inertia of the power turbine portion of the engine, the transmission and propeller need be braked. With continued movement of handle 89 to reverse (REV) position, supply passage 94 is disconnected from forward port 97 and connected to radial exhaust passage 93 to disengage forward clutch 37, so the already engaged reverse brake 52 establishes reverse drive. Then, as on a shift to forward, on the shift to reverse, power transfer clutch branchline 101 is blocked to restore control of power transfer clutch 30 by engine controls 34. Power transfer clutch 30 is disengaged during the entire braking period, especially during initial slipping engagement. Movement of handle 89 between forward (FWD) and reverse (REV) positions through braking neutral (BN) position is the normal drive operation shift path, providing in the braking neutral (BN) position reduction of engine inertia by disconnecting the compressor section by disengaging power transfer clutch 30 and, by braking of the transmission input and power turbine section of the engine and of the transmission output and driven load, propeller, for a limited time period to reduce the rotating mass and speed and thus the inertia of the input drive and output drive for smooth shifting.

Handle 89 is also movable from either forward (FWD) or reverse (REV) position to a positive neutral (PN), the accessory drive path through neutral (PN) position, to disestablish both forward clutch 37 and reverse brake 52 to provide positive neutral so the engine may idle to drive only accessories 24 or accessory load without load due to braking by the transmission or the driven load, e.g., propeller load. The engine controls 34 will control the fuel feed and power transfer clutch 30 to meet accessory load. In positive neutral (PN) position, engine controls 34 via power transfer clutch apply line 35 control power transfer clutch 30 since power transfer clutch branchline 101 at its port 103 is blocked by land 106. On a shift from positive neutral (PN) position to either forward (FWD) or reverse (REV) position, branchline 101 via its port 103 is connected respectively by exhaust port 107 or 109 and passage 108 or 110 to exhaust passage 91, so power transfer clutch 30 is disengaged until the drive is engaged.

When the engine is not running and the boat is sailing or being towed, it is desired to prevent rotation of engine 10 and transmission 11 which will occur when the propeller 40 moves through the water. An auxiliary source of fluid pressure independent of engine 10 is provided by auxiliary pump 73 driven by electric motor 74. Under these conditions, switch 76 is closed to energize electric motor 74 to drive pump 73 and supply fluid pressure, regulated by regulator valve 79, to mainline 72. Control valve 82, though functional in all positions, normally is placed in braking neutral (BN) position to supply fluid pressure to both forward and reverse apply lines 44 and 59 to simultaneously engage both forward clutch 37 and reverse brake 52 to brake both transmission input and output shafts 21 and 39, so propeller 40 does not drive transmission 11 and engine 10.

OPERATION

While it is believed that the operation of the FIG. 1 power train will be apparent from the above detailed description, the operational features are summarized below.

When the engine 10 is being started, transmission control valve 82 is placed in positive neutral (PN) position to connect forward apply line 44 and forward apply port 97 to radial exhaust passage 92 and reverse apply line 59 and port 98 to radial exhaust passage 93, so release springs 46 and 61 respectively disengage forward clutch 37 and reverse brake 52 to provide positive neutral. Engine controls 34 will disengage power transfer clutch 30 during starting. Since the power transfer clutch apply branchline 101 at port 103 is blocked by land 106, power transfer clutch 30 is controlled by engine controls 34. When engine 10 is running, rotation of compressor shaft 27 drives the pumps of engine controls 34 and transmission pump 67 to provide the regulated pressure source for the engine and transmission controls, even though the transmission in braking neutral holds the drive train, power turbine 16, input shaft 21, and output shaft 39 stationary. Positive neutral operation is used to drive the accessories 24, such as a generator for the lighting and electric power system of the boat, when it is not desired to drive propeller 40. When engine 10 is running, compressor shaft 27 drives transmission main pump 67 to provide fluid pressure regulated by regulator valve 69 to mainline 72. This source of fluid pressure is controlled by control valve 82 to selectively or simultaneously engage the forward or reverse drive establishing devices, forward clutch 37, and reverse brake 52, respectively. The forward or reverse drive establishing devices are selectively engaged to selectively establish forward or reverse drive, and simultaneously engaged to brake the transmission input and output shafts 21 and 39.

To initially drive the boat, control valve 82 is moved from positive neutral (PN) position through the positive neutral path to either forward (FWD) or reverse (REV) position to establish respectively either forward or reverse drive. In forward (FWD) position, mainline 72 is connected by supply port 96 and passage 94 to forward port 97 and forward apply line 44 to engage forward clutch 37, and reverse brake apply line 59 is connected by reverse port 98 and radial exhaust passage 92 to disengage reverse brake 52 to disestablish reverse drive. Similarly, in reverse (REV) position, mainline 72 is connected by supply port 96 and passage 94 to reverse port 98 and reverse apply line 59 to engage reverse brake 52, and forward clutch apply line 44 is connected by forward port 97 and radial exhaust passage 93 to axial exhaust passage 91 to disengage forward clutch 37 for establishing reverse drive. During these shifts from positive neutral (PN) to either forward (FWD) or reverse (REV) position, control valve 82 first connects power transfer clutch branchline 101 via port 103, exhaust ports 107 or 109 and passages 108 or 110, to exhaust passage 91 to ensure disengagement of the power transfer clutch 30, and then provides respectively fluid supply via either forward apply line 44 or reverse apply line 59 at a pressure gradually increased by forward trimmer valve 111 or reverse trimmer valve 112 to engage either forward or reverse drive, and then blocks power transfer clutch branchline 101, so power transfer clutch 30 may be engaged by the engine controls 34. In the forward (FWD) and reverse (REV) positions, control valve 82 continues to supply respectively the forward or reverse apply line 44 or 59 for forward or reverse drive, and power transfer clutch 30 is controlled by engine controls 34.

During drive operation of the boat, control valve 82 is rotated or shifted through the drive operation path, passing through braking neutral (BN) position on shifts between forward (FWD) and reverse (REV) drive positions. In braking neutral (BN) position shown in FIG. 1, mainline 72 is connected by supply port 96 and supply passage 94 to supply both the forward and reverse ports 97 and 98 and apply lines 44 and 59, to engage both forward clutch 37 and reverse brake 52 to brake both transmission input and output shafts 21 and 39, to brake the entire power train from power turbine 16 to propeller 40. In braking neutral (BN) position, control valve 82 exhausts power transfer clutch apply branchline 101 via ports 103, 104, to exhaust passage 91 to overcontrol engine controls 34 to prevent engagement of power transfer clutch 30. In forward drive, control valve 82 supplies forward apply line 44 to engage forward clutch 37, exhausts reverse apply line 59 to disengage reverse brake 52, and blocks power transfer clutch branchline 101, so engine controls 34 control power transfer clutch 30. On a shift from forward drive to reverse drive, forward clutch 37 is initially engaged, then control valve 82 first exhausts power transfer clutch branchline 101 to disengage power transfer clutch 30 if engagement is called for by engine controls 34, to reduce engine inertia, and then reverse brake 52 is additionally engaged to brake the drive train to reduce speed and inertia for the subsequent release of forward clutch 37 to permit the already engaged reverse brake 52 to establish reverse drive. Similarly, on a shift from reverse drive to forward drive, reverse brake 52 remains engaged, power transfer clutch 30 is disengaged, and forward clutch 37 is additionally engaged as control valve 82 moves through braking neutral (BN) position to retard or stop the drive train rotation, and then reverse brake 52 is disengaged, so the already engaged forward clutch 37 establishes forward drive. Thus the power transfer clutch 30 is disengaged during the initial slipping engagement of the second drive establishing device when engaged for braking, and remains disengaged until one drive establishing device is released to establish the drive provided by the other drive establishing device.

MODIFIED POWER TRAIN

Since the modified power train of FIG. 2 is basically similar to the above-described power train of FIG. 1, like reference numerals, primed, have been used with reference to the FIG. 1 description, and the similarities and differences pointed out below.

The engine 10', including its power transfer clutch 30', the drives therefor 29', 33', the engine controls 34', and the drive 23' for accessories 24', are the same as described above for engine 10. The transmission 11' has the same drive train as transmission 11, but the FIG. 2 forward clutch 37' and reverse brake 52' are spring-engaged and fluid pressure disengaged, whereas the FIG. 1 forward clutch 37 and reverse brake 52 are fluid pressure engaged and spring-disengaged. Thus in FIG. 2, in forward clutch 37', piston 42' is biased by apply spring 46' to engage forward clutch 37', and fluid pressure is supplied by forward release line 44' to release cylinder 43' to disengage forward clutch 37'. Similarly, reverse brake 52' is engaged by apply spring 61' acting on piston 57', and disengaged by fluid pressure supplied by reverse release line 59' to release cylinder 58' to act on piston 57'.

The fluid pressure source has the same sump 66', pump 67', and regulator valve 69' to supply mainline 72' when the engine is running. During engine starting the fuel pump and fluid pump of engine controls 34' and pump 67' for the transmission control fluid pressure source quickly become operative for starting engine control and positive neutral operation of the transmission. Since fluid pressure is not required for operation when the engine is shut down, the auxiliary fluid pressure source 73,74, is not required, but it may be used if positive neutral transmission operation is desired before starting the engine.

Control valve 82' has a valve element 83' rotatable in bore 84' in body 86', with a handle 89' secured to endportion 87' of valve element 83' and supply port 96' and exhaust passage 91', are the same as shown in FIG. 1 and described above. In control valve 82', the valve positions and the relation of supply passage 94' and exhaust passages 92',93', are changed relative to FIG. 1 as shown in FIG. 2 in relation to supply port 96' and forward and reverse release ports 97',98', to provide forward and reverse release pressures rather than apply pressure in FIG. 1, as described above. In the braking neutral (BN) position shown, forward and reverse release lines 44' and 59' are respectively connected by forward and reverse release ports 97',98', and exhaust passages 92',93', to axial exhaust passage 91' to permit apply springs 46',61', to simultaneously engage forward clutch 37' and reverse brake 52'.

On movement of control valve 82' counterclockwise to forward (FWD) position, supply passage 94' connects supply port 96' to reverse release port 98' to disengage reverse, and forward port 97' is quickly changed from exhaust passage 92' to exhaust passage 93', so forward remains engaged to establish forward drive. On movement of control valve 82' clockwise to reverse (REV) position, supply passage 94' connects supply port 96' to forward release port 97' to disengage forward, and reverse port 98' is quickly changed from exhaust passage 93' to exhaust passage 92', so reverse remains engaged to establish reverse drive. In positive neutral (PN) position, supply passage 94' connects supply port 96' to both forward and reverse release ports 97',98', to disengage both forward and reverse for positive neutral.

Control valve 82' (FIG. 2) has a section 102' similar to section 102 of control valve 82 of FIG. 1, to control exhaust of power transfer clutch branchline 101' to control disengagement of power transfer clutch 30' in the braking neutral (BN) position as described above relative to FIG. 1. Exhaust port 104' (FIG. 2) has a greater circumferential length than exhaust port 104 of FIG. 1 because rotation of valve element 83' (FIG. 2) from forward (FWD) through braking neutral (BN) to reverse (REV) positions is larger than the similar rotation of valve element 83 in FIG. 1. As in the FIG. 1 arrangement, on movement of control valve 82' from one drive position to braking neutral (BN) position, the power transfer clutch 30' is, if engaged by engine controls 34', disengaged and then the other drive engaged to brake the drive train. Power transfer clutch 30' is engaged in positive neutral (PN) and during a shift to forward or reverse drive normally made with the engine idling. If it is desired to disengage power transfer clutch 30' to make high power shifts from positive neutral (PN) to either forward (FWD) or reverse (REV) position, shorter exhaust ports similar to exhaust ports 107, 109, can be used.

When the engine 10' is shut down and the boat is sailing, there is no fluid pressure supply and with control valve 82' in braking neutral (BN) position, springs 46' and 61' respectively engage forward clutch 37' and reverse brake 52' for braking neutral, so the engine 10' and transmission 11' will not rotate due to the action of water on the propeller 40'.

A further modification of the above-described marine drive and control system shown in FIG. 1 is now described with reference to FIG. 1 and FIG. 3, which shows the modified portion. This modification is the same as the above marine drive and control system shown in FIG. 1, with the selector valve 82 modified by omitting section 102 and the exhaust control ports therein and substituting the exhaust valve 116 of FIG. 3. The power transfer clutch apply line 35 is similarly connected by branchline 101" to exhaust valve 116. Exhaust valve 116 is normally biased by spring 117 to the closed position shown to block exhaust flow from clutch apply branchline 101", which is like FIG. 1 branchline 101, to exhaust 118 so the engine controls 34 control power transfer clutch 30 and is responsive to reverse drive apply pressure supplied by reverse apply line 59 and its branch 59" to open exhaust valve 116 to connect clutch apply branchline 101" to exhaust 118 to disengage, or prevent engagement of, power transfer clutch 30 by engine controls 34.

In this FIG. 3 modification of FIG. 1, the control valve 82 provides forward drive in forward (FWD) position, reverse drive in reverse (REV) position, both forward and reverse drive simultaneously for braking in braking neutral (BN) position, and no drive for a positive neutral in positive neutral (PN) position, as described above with reference to FIG. 1. When fluid pressure is supplied by control valve 82 to reverse apply line 59 and its branch 59", exhaust valve 116 in exhaust position exhausts clutch apply line 35 and its branch 101" to prevent engagement of power transfer clutch 30. The power transfer clutch 30 is disengaged in braking neutral to reduce engine inertia and may be engaged by the engine controls 34 during positive neutral and forward drive operation for maximum and optimum engine operation. The power transfer clutch 30 will not be operative in reverse drive where maximum and optimum engine operation is not normally required.

Since the engine controls 34, 34', disengage power transfer clutch 30, 30', during starting and/or the control valve 82, 82' disengages the power transfer clutch 30, 30', in the braking neutral position, engine 10, 10', may be started with the control valve 82, 82', for controlling the transmission and power transfer clutch 30, 30', in braking neutral position.

The dual planetary pinions 50, 50', are a plurality of set of two pinions meshing with each other, ad one pinion meshing with the ring gear, and the other pinion meshing with the sun gear.

It will be appreciated that the invention shown in the preferred embodiments may be modified.

I claim:

1. In a powershift transmission: an input; an output; gear means connecting said output and input having first drive means including first friction means and first actuator means individually selectively operable on said first friction means to establish a first drive and second drive means including second friction means and second actuator means individually selectively operable on said friction means to establish a second drive; said first actuator means and said second actuator means being simultaneously operable respectively on said first friction means and said second friction means to control said gear means to brake said input and said output to a stationary position; control means having a control member movable between a first position and a second position through a neutral position or an accessory position operative in said first position on said first actuator means to establish said first drive, in said second position on said second actuator means to establish said second drive, in said neutral position to simultaneously actuate both said first actuator and said second actuator means to establish both said first drive and said second drive to brake said input and output and in said accessory position to actuate both said first actuator and said second actuator means to disestablish both said first drive and said second drive to establish a positive neutral condition permitting free running of said input and output.

2. In a powershift transmission: an input; an output; gear means connecting said input and output having forward drive means including forward friction means and forward actuator means individually selectively operable on said forward friction means to establish forward drive and reverse drive means including reverse friction means and reverse actuator means individually selectively operable on said reverse friction means to establish reverse drive; said forward actuator means and said reverse actuator means being simultaneously opearable respectively on said forward friction means and said reverse friction means to control said gear means to brake said input and said output to a stationary position; control means having a control member movable between a forward position and a reverse position selectively in one path through a neutral position and in another path through an accessory position operative in said forward position on said forward actuator means to establish said forward drive, in said reverse position on said reverse actuator means to establish said reverse drive, in said neutral position to simultaneously actuate both said forward actuator and said reverse actuator means to establish both said forward drive and said reverse drive to brake said input and output and in said accessory position to actuate both said forward actuator and said reverse actuator means to disestablish both said forward drive and said reverse drive to establish a positive neutral condition permitting free running of said input and output.

3. In a powershift transmission: an input driven by a two-shaft gas turbine engine having engine controls and power transfer means engaged by said engine controls; an output; gear means connecting said input and output having forward drive means including forward friction means and forward actuator means individually selectively operable on said forward friction means to establish forward drive, and reverse drive means including reverse friction means and reverse actuator means individually selectively operable on said reverse friction means to establish reverse drive; said forward actuator means and said reverse actuator means being simultaneously operable respectively on said forward friction means and said reverse friction means to control said gear means to brake said input and said output to a stationary position; control means having a control member movable between a forward position and a reverse position selectively through a neutral position and an accessory position operative in said forward position on said forward actuator means to establish said forward drive and to provide control of said power transfer means by said engine controls, in said reverse position on said reverse actuator means to establish said reverse drive, in said neutral position to first disengage said power transfer means and then to simultaneously actuate both said forward actuator and said reverse actuator means to establish both said forward drive and said reverse drive to brake said input and output and in said accessory position to provide control of said power transfer means by said engine controls and to actuate both said forward actuator and reverse actuator means to disestablish both said forward drive and said reverse drive to establish a positive neutral condition permitting free running of said input and output.

4. The invention defined in claim 3, and said control means operative to disengage said power transfer means in response to establishing said reverse drive for operation in neutral and reverse positions and to provide control of said power transfer means by said engine controls in said forward and accessory positions.

5. The invention defined in claim 3, and said control means operative to disengage said power transfer means in response to said control member being in said neutral position and to provide control of said power transfer means by said engine controls in said forward, reverse, and accessory positions.

6. In a powershift transmission: an input; accessories driven by said input; an output; gear means connecting said input and output having forward drive means including forward friction means and forward actuator means individually selectively operable on said forward friction means to establish forward drive, and reverse drive means including reverse friction means and reverse actuator means individually selectively operable on said reverse friction means to establish reverse drive; said forward actuator means and said reverse actuator means being simultaneously operable respectively on said forward friction means and said reverse friction means to control said gear means to brake said input and said output to a stationary position; control means having a control member movable between a forward position and a reverse position selectively in one path through a neutral position and in another path through an accessory position operative in said forward position on said forward actuator means to establish said forward drive, in said reverse position on said reverse actuator means to establish said reverse drive, in said neutral position to simultaneously actuate both said forward actuator and said reverse actuator means to establish both said forward drive and said reverse drive to brake said input and output momentarily when said input is being driven to reduce speed and shift shock on a shift between said forward and reverse drives and continuously when said input is not being driven to hold both said input and output stationary, and in said accessory position to actuate both said forward actuator and said reverse actuator means to disestablish both said forward drive and said reverse drive to establish a positive neutral condition permitting free running of both said input and output to permit continuous drive of said input and said input driven accessories.

7. In a marine propeller drive: a propeller; accessories; an engine output; a two-shaft gas turbine engine having a power turbine drive connected to said accessories and engine output; a compressor, a compressor turbine driving said compressor and gas-generating means supplying both said turbines; a powershift transmission having a transmission input driven by said engine output, a transmission output driving said propeller, gear means connecting said transmission input and transmission output having forward drive means including forward friction means and forward actuator means individually selectively operable on said foward friction means to establish forward drive, and reverse drive means including reverse friction means and reverse actuator means individually selectively operable on said reverse friction means to establish reverse drive; said forward actuator means and said reverse actuator means being simultaneously operable respectively on said forward friction means and said reverse friction means to control said gear means to brake said transmission input and said drive connected engine output and also said transmission output and said driven propeller to a stationary position; control means having a control member movable between a forward position and a reverse position selectively in a first path through a neutral position and in a second path through an accessory position operative in said forward position on said forward actuator means to establish said forward drive from said engine output to said propeller, in said reverse position on said reverse actuator means to establish said reverse drive from said engine output to said propeller, in said neutral position to simultaneously actuate both said forward actuator and said reverse actuator means to establish both said forward and reverse drive to brake said transmission input and said engine output and also said transmission output and said propeller, and in said accessory position to actuate both said forward actuator and said reverse actuator means to disestablish both said forward drive and said reverse drive to establish a positive neutral condition permitting free running of said transmission input and transmission output for engine output drive of said accessories with said propeller disconnected.

8. The invention defined in claim 7, and said control means being operative when said engine is running and operative to provide said neutral position operation when said engine is not running.

9. The invention defined in claim 7, and said control means being a hydraulic control means employing fluid pressure to establish said forward and reverse drives and return spring means to disestablish said forward and reverse drives on exhaust of said fluid pressure and having first source means of regulated pressure fluid driven by said compressor turbine for operation of said hydraulic control means during engine operation and a second source means of regulated pressure fluid driven independently of said engine and selectively operable to supply said fluid pressure for operation in said neutral position to brake said transmission input and output when said engine is not running.

10. The invention defined in claim 7, and said control means being a hydraulic control means employing spring means to establish said forward and reverse drives and fluid pressure to disestablish said forward and reverse drives and having a source of regulated pressure fluid driven by said compressor turbine for operation in all positions of said control member when said engine is running and said spring means and said control means providing said neutral position operation braking said transmission input and output when said engine is not running and said source is not supplying regulated pressure fluid to said control means.

11. In a marine propeller drive: a propeller; accessories; an engine output; a two-shaft gas turbine engine having a power turbine drive connected to said accessories and said engine output; a compressor; a compressor turbine driving said compressor, gas-generating burner means receiving air from said compressor, burning fuel and delivering gas to both said turbines; power transfer means including a control providing a power transfer signal pressure varying with engine operating conditions for engaging a drive for transmitting increasing power between said compressor turbine and power turbine with increasing power transfer signal pressure; a powershift transmission having a transmission input driven by said engine output, a transmission output driving said propeller, gear means connecting said transmission input and transmission output having forward and reverse drive means including respectively forward and reverse friction means and forward and reverse actuator means controlled by fluid under pressure to respectively individually selectively establish forward drive and reverse drive and simultaneously operable to establish both said forward and reverse friction means to brake the drive train comprising said transmission input, engine output, power turbine, transmission output and propeller, to reduce speed; source means providing fluid pressure when said engine is running and said compressor turbine is rotating; control means connected to said forward and reverse actuator means, said source means and power transfer means having a rotary control valve member rotatable between a forward position and a reverse position selectively in a first path on one side through a neutral position and in a second path on the other side through an accessory position, operative to control the supply of fluid to and exhaust of fluid from said forward and reverse actuator means for operation in said forward position and said reverse position to respectively establish said forward drive and said reverse drive and provide control of said power transfer means by said power transfer signal pressure, operative on a shift from either one of said forward and reverse positions to the other of said forward and reverse positions to first exhaust said power transfer signal pressure to disengage said power transfer means, to then engage said other of said forward and reverse drives so both said drives are engaged to brake said drive train, to then disengage said one drive to establish said other drive and to provide control of said power transfer means by said power transfer signal pressure in said other drive and operative in said accessory position to disestablish both said forward and reverse drives and to provide control of said power transfer means by said power transfer signal pressure and operative on a shift to either one of said forward and reverse positions and drives to first exhaust said power transfer signal pressure to disengage said power transfer means, to then establish said one drive and then provide control of said power transfer means by said power transfer signal pressure.

12. The invention defined in claim 11, and said control means being a hydraulic control means employing fluid pressure to establish said forward and reverse drives and return spring means to disestablish said forward and reverse drives on exhaust of said fluid pressure and having first source means of regulated pressure fluid driven by said compressor turbine for operation of said hydraulic control means during engine operation and a second source means of regulated pressure fluid driven independently of said engine and selectively operable to supply said fluid pressure for operation in said neutral position to brake said transmission input and output when said engine is not running.

13. The invention defined in claim 11, and said control means being a hydraulic control means employing spring means to establish said forward and reverse drives and fluid pressure to disestablish said forward and reverse drives and having a source of regulated pressure fluid driven by said compressor turbine for operation in all positions of said control member when said engine is running and said spring means and said control means providing said neutral position operation braking said transmission input and output when said engine is not running and said source is not supplying regulated pressure fluid to said control means.

14. In a powershift transmission: an input; an output; gear means connecting said input and output having forward drive means including forward friction means and forward actuator means individually selectively operable, when individually supplied with fluid under pressure on said forward friction means to establish forward drive and reverse drive means including reverse friction means and reverse actuator means individually selectively operable, when individually supplied with fluid under pressure, on said reverse friction means to establish reverse drive; said forward actuator means and said reverse actuator means being simultaneously operable, when both are simultaneously supplied with fluid under pressure, respectively on said forward friction means and said reverse friction means to control said gear means to brake said input and said output to a stationary position; a source of fluid pressure supplied independently of and while said input and output are in said stationary position; control means connected to said source, said forward actuator means and said reverse actuator means and having a control member movable between a forward position and a reverse position selectively in one path, through a neutral position in another path through an accessory position, operative in said forward position to connect said source to said forward actuator means to establish said forward drive and to exhaust said reverse actuator means to disestablish said reverse drive, in said reverse position to connect said source to said reverse actuator means to establish said reverse drive and to exhaust said forward actuator means to disestablish said forward drive in said neutral position to simultaneously actuate both said forward actuator and said reverse actuator means to establish both said forward drive and said reverse drive to brake said input and output and in said accessory position to exhaust both said forward actuator and said reverse actuator means to disestablish both said forward drive and said reverse drive to establish a positive neutral condition permitting free running of said input and output.

15. The invention defined in claim 14, and a gas turbine engine having a compressor turbine and a power turbine driving said input; said source including a first pump means driven to supply fluid under pressure by said compressor turbine when said engine is operating, and a second pump means driven independently of said engine input and output to permit establishing said neutral position to brake said input and output when said engine is not operating.

16. In a powershift transmission: an input; an output; gear means connecting said input and output having forward drive means including forward friction means and forward actuator means individually selectively operable on said forward friction means to establish forward drive, and reverse drive means including reverse friction means and reverse actuator means individually selectively operable on said reverse friction means to establish reverse drive; said forward actuator means and said reverse actuator means being simultaneously operable respectively on said forward friction means and said reverse friction means to control said gear means to brake said input and said output to a stationary position; a source of fluid pressure supplied independently of and while said input and output are in said stationary position; said forward and said reverse actuator means being normally operable when exhausted to respectively establish said forward and said reverse drives and operable by said fluid pressure for release to respectively disestablish said forward and said reverse drives; control means connected to said source, said forward actuator means and said reverse actuator means and having a control member movable between a forward position and a reverse position selectively in one path through a neutral position and in another path through an accessory position operative, when said source is operative, in said forward position to connect said source to said reverse actuator means to disestablish said reverse drive and to exhaust said forward actuator means to establish said forward drive, in said reverse position to connect said source to said forward actuator means to disestablish said reverse drive and to exhaust said reverse actuator means to establish said reverse drive, in said neutral position to simultaneously exhaust both said forward actuator and said reverse actuator means to establish both said forward drive and said reverse drive to brake said input and said output, and in said accessory position to connect said source to both said forward actuator and said reverse actuator means to disestablish both said forward drive and said reverse drive to establish a positive neutral condition permitting free running of said input and output and operative, when said source is inoperative, to provide said neutral position operation.

* * * * *